United States Patent
Frank et al.

(10) Patent No.: US 9,567,941 B2
(45) Date of Patent: Feb. 14, 2017

(54) WASTE-HEAT UTILIZATION DEVICE FOR A MOTOR VEHICLE

(71) Applicant: Daimler AG, Stuttgart (DE)

(72) Inventors: Volodymyr Frank, Gemmrigheim (DE); Manuel Jung, Stuttgart (DE); Christoph Junker, Backnang (DE); Eugen Krebs, Stuttgart (DE); Alexander Kropp, Stuttgart (DE); Thomas Streule, Winnenden (DE)

(73) Assignee: Daimler AG, Stuttgart (DE)

(*) Notice: Subject to any disclaimer, the term of this patent is extended or adjusted under 35 U.S.C. 154(b) by 96 days.

(21) Appl. No.: 14/383,283

(22) PCT Filed: Mar. 6, 2013

(86) PCT No.: PCT/EP2013/000652
§ 371 (c)(1),
(2) Date: Sep. 5, 2014

(87) PCT Pub. No.: WO2013/131642
PCT Pub. Date: Sep. 12, 2013

(65) Prior Publication Data
US 2015/0075163 A1    Mar. 19, 2015

(30) Foreign Application Priority Data
Mar. 7, 2012 (DE) .................. 10 2012 004 600

(51) Int. Cl.
*F02G 3/00* (2006.01)
*F01K 23/10* (2006.01)
(Continued)

(52) U.S. Cl.
CPC ............... *F02G 5/02* (2013.01); *F01K 23/065* (2013.01); *F01K 23/10* (2013.01); *F01K 23/14* (2013.01);
(Continued)

(58) Field of Classification Search
CPC .......... F02G 5/02; F01K 23/065; F01K 23/10; F01K 23/14; F01N 5/02; F22B 1/1807
(Continued)

(56) References Cited

U.S. PATENT DOCUMENTS 2,475,229 A * 7/1949 Findley ................. B60K 25/00
310/105
4,405,029 A 9/1983 Hunt
(Continued)

FOREIGN PATENT DOCUMENTS

DE    24 00 760 A1    9/1975
DE    41 41 051 A1    6/1993
(Continued)

OTHER PUBLICATIONS

A certified English translation of Soichiro Miyazaki (Pub. Number JP 59-221409 A), published on Dec. 13, 1984.*
(Continued)

*Primary Examiner* — Thai Ba Trieu
(74) *Attorney, Agent, or Firm* — Crowell & Moring LLP

(57) ABSTRACT

A waste heat utilization device for a motor vehicle includes a waste heat utilization circuit in which a working medium circulates. The water heat utilization circuit includes a conveying device, an evaporator, an expansion machine, and a condenser. The waste heat utilization device also includes an electrical generator in direct or indirect drive connection with a power take-off shaft of an internal combustion engine. The expansion machine is in direct drive connection with the power take-off shaft of the internal combustion engine for purposes of energy recirculation.

9 Claims, 3 Drawing Sheets

Figure 1:
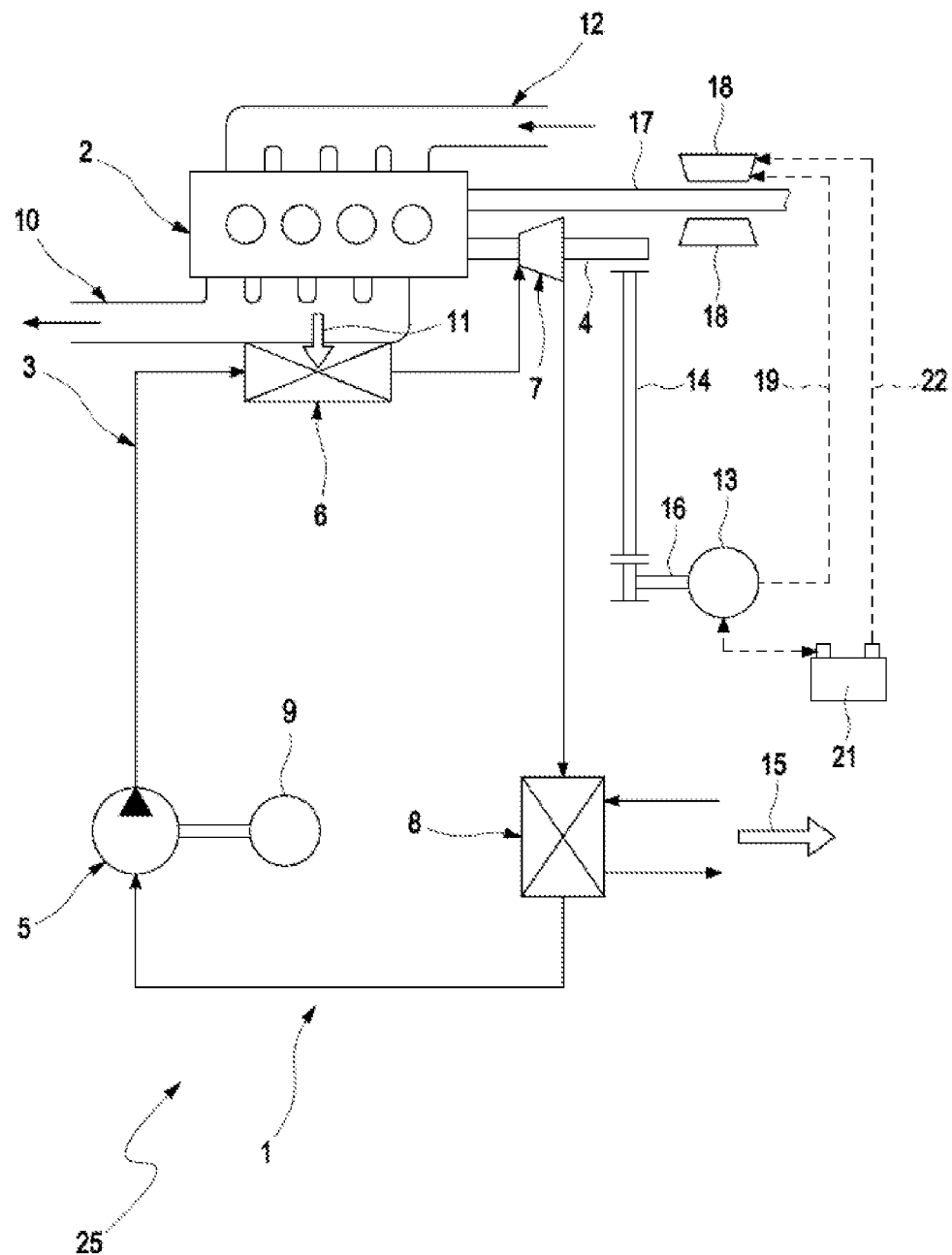

(51) Int. Cl.
    *F01K 25/00*     (2006.01)
    *B60K 6/20*     (2007.10)
    *F02G 5/02*     (2006.01)
    *F01K 23/06*     (2006.01)
    *F01K 23/14*     (2006.01)
    *F22B 1/18*     (2006.01)
    *F01N 5/02*     (2006.01)

(52) U.S. Cl.
    CPC ............... *F01N 5/02* (2013.01); *F22B 1/1807* (2013.01); *Y02T 10/16* (2013.01); *Y02T 10/166* (2013.01)

(58) Field of Classification Search
    USPC ........................... 60/618, 616, 597, 670–671
    See application file for complete search history.

(56) References Cited

U.S. PATENT DOCUMENTS

| | | | |
|---|---|---|---|
| 4,886,978 A * | 12/1989 | Kawamura | F02G 5/02 60/597 |
| 6,526,754 B1 | 3/2003 | Bronicki | |
| 6,725,662 B2 * | 4/2004 | Baba | F01K 23/065 60/670 |
| 6,928,820 B2 * | 8/2005 | Inaba | F01K 23/065 60/618 |
| 7,637,108 B1 | 12/2009 | Langson | |
| 8,739,531 B2 * | 6/2014 | Teng | F01K 23/065 60/618 |
| 9,021,807 B2 * | 5/2015 | Gaertner | F01K 23/065 60/618 |
| 2006/0107681 A1 | 5/2006 | Uno et al. | |
| 2009/0031724 A1 | 2/2009 | Ruiz | |
| 2010/0101228 A1 | 4/2010 | Bartosch et al. | |
| 2013/0219882 A1 * | 8/2013 | Jensen | F02G 5/02 60/604 |
| 2013/0239571 A1 * | 9/2013 | Hartmann | F01K 23/10 60/618 |
| 2013/0327041 A1 * | 12/2013 | Gaertner | F02G 5/02 60/618 |
| 2013/0333381 A1 * | 12/2013 | Bourhis | F01K 23/10 60/618 |
| 2014/0033704 A1 * | 2/2014 | Laux | F02B 27/00 60/597 |
| 2014/0290243 A1 * | 10/2014 | Enokijima | F01K 23/10 60/618 |

FOREIGN PATENT DOCUMENTS

| | | | | |
|---|---|---|---|---|
| DE | 19735909 A1 * | 2/1999 | | F01K 23/14 |
| DE | 10 2005 051 428 A1 | 5/2006 | | |
| DE | 10 2009 010 314 A1 | 8/2010 | | |
| DE | 10 2009 028 153 A1 | 2/2011 | | |
| EP | 1 249 585 A1 | 10/2002 | | |
| EP | 1 326 017 A1 | 7/2003 | | |
| EP | 1 987 246 B1 | 3/2012 | | |
| JP | 59-221409 A | 12/1984 | | |
| JP | 10-89015 A | 4/1998 | | |
| JP | 2001-207910 A | 8/2001 | | |
| JP | 2011-196209 A | 10/2011 | | |

OTHER PUBLICATIONS

Machine Translation to Tanaka Hideyuki (Pub. Number JP 2011-196209 A), published on Oct. 6, 2011.*
International Search Report dated Aug. 28, 2013 with English translation (seven (7) pages).
German Search Report dated Oct. 16, 2012, including English translation (ten (10) pages).
Japanese Office Action issued in Japanese counterpart application No. 2014-560271 dated Dec. 1, 2015, with partial English translation (Seven (7) pages).
Japanese Office Action issued in counterpart Japanese Application No. 2014-560271 dated Sep. 6, 2016 with English translation (seven pages).

* cited by examiner

WASTE-HEAT UTILIZATION DEVICE FOR A MOTOR VEHICLE

BACKGROUND AND SUMMARY OF THE INVENTION

Exemplary embodiments of the present invention relate to a waste heat utilization device for a motor vehicle having an internal combustion engine. Exemplary embodiments of the invention further relate to a motor vehicle having such a waste heat utilization device, and an operating method for a motor vehicle having such a waste heat utilization device.

A conventional waste heat utilization device, which preferably operates according to the Rankine cycle or according to the Clausius-Rankine cycle, usually includes a waste heat utilization circuit in which a working medium circulates. A conveying device for driving the working medium, an evaporator for evaporating the working medium, an expansion machine for expanding the working medium, and a condenser for condensing the working medium are successively situated in the waste heat utilization circuit in the direction of flow of the working medium.

German patent document DE 24 00 760 describes a motor vehicle that may be alternatively or simultaneously driven by an internal combustion engine and an electric motor.

U.S. Pat. No. 4,405,029 discloses a hybrid vehicle that includes an internal combustion engine and an electric motor. The electric motor may be operated by means of a waste heat utilization device. The electric motor may be used for driving a transmission as well as for charging a battery. The electrical energy stored in the battery may in turn be used, if necessary, for driving the electric motor.

European patent document EP 1 249 585 A1 discloses a heat exchanger of a multi-cylinder internal combustion engine. The heat exchanger may be designed as a waste heat utilization device that is mounted in a motor vehicle. The waste heat utilization device in turn includes an evaporator that generates steam at an elevated temperature and elevated pressure, wherein waste heat, such as exhaust gas of an internal combustion engine, is used as the heat source. A rotary shaft is driven by means of an expansion machine by expansion of the high-pressure steam, and the steam is re-condensed by means of a condenser. By means of the expansion device, an output shaft of an internal combustion engine as well as an electrical generator which may, for example, electrically charge an electrical energy store, in particular a rechargeable battery, may be driven via a mechanical coupling.

European patent document EP 1 326 017 A1 describes a Rankine circuit system for utilizing waste heat of an exhaust gas from a hybrid vehicle. The system includes an internal combustion engine as the drive source for the motor vehicle, and an electric generator motor. An output torque of the system is supplied to a transmission, and is used to provide an additional drive force for a drive train of the motor vehicle or to electrically charge a chargeable battery. During an acceleration of the motor vehicle, thermal energy of the exhaust gas is utilized by the system, and during a deceleration of the motor vehicle, the kinetic energy of the motor vehicle is converted to provide regenerative electrical power for the electric generator motor, so that the fuel consumption in the internal combustion engine may be reduced.

Exemplary embodiments of the present invention are directed to an improved design for a waste heat utilization device and for a motor vehicle using such a waste heat utilization device. Exemplary embodiments of the present invention are also directed to an improved operating method for such a motor vehicle.

The waste heat utilization device according to the invention includes a waste heat utilization circuit in which a working medium circulates. The waste heat utilization device includes a conveying device, situated in the waste heat utilization circuit, for driving the working medium, and an evaporator, situated in the waste heat utilization circuit downstream from the conveying device, for evaporating the working medium. Furthermore, the waste heat utilization device includes an expansion machine, situated in the waste heat utilization circuit downstream from the evaporator, for expanding the working medium, and a condenser, situated in the waste heat utilization circuit downstream from the expansion machine, for condensing the working medium.

For energy recovery, the expansion machine is now in direct drive connection with a power take-off shaft of the internal combustion engine. Output drive power of the internal combustion engine of the motor vehicle may be assisted in this way. In addition, as the result of providing an electrical generator that is in direct or indirect drive connection with the power take-off shaft, besides the above-mentioned direct energy recovery, the generation of electrical energy is also possible. The electrical energy generated in this way may be used in particular for driving an electric motor, via which in turn the drive of a main output shaft of the internal combustion engine may be assisted. Alternatively or additionally, however, it is also possible for the generated electrical energy to be temporarily stored in a suitable energy store, such as a chargeable battery. By means of the electrical energy that is temporarily stored in such a battery, an electric motor situated on a main output shaft of the internal combustion engine may then be driven, or, if the electrical generator is designed as a so-called generator motor, the electrical generator may be driven for operation as an electric motor by means of the electrical energy stored in the energy store, in order to likewise assist the drive power of the internal combustion engine via the power take-off shaft. The efficiency of the internal combustion engine may be significantly increased by means of a waste heat utilization device designed according to the invention as described above.

In one embodiment the expansion machine may have a rotor and a turbine wheel connected to the rotor in a rotationally fixed manner and drivable by the energy that is released during expansion of the working medium, wherein the power take-off shaft of the internal combustion engine is the rotor of the expansion machine. According to the invention, the term "direct drive connection" is thus understood to mean that the expansion machine is situated directly on the power take-off shaft of the internal combustion engine, so that the power take-off shaft simultaneously functions as a rotor of the expansion machine. A space-saving and technically simple, and therefore cost-effective, design of the waste heat utilization device according to the invention is thus possible.

In one embodiment, the electrical generator may be situated on the power take-off shaft. In that case, the expansion machine and the electrical generator are both placed on the power take-off shaft of the internal combustion engine, as the result of which the space requirements for the waste heat utilization device according to the invention may be further reduced.

Alternatively, however, it is possible to situate the electrical generator on a separate generator shaft that is in operative connection with the power take-off shaft. The electrical generator may thus be spatially separate from the expansion machine if this should be necessary for technical reasons, for example.

The power take-off shaft is then in drive connection with the generator shaft by means of a wheel drive, in particular a belt drive, chain drive, or gear drive. A torque of the power take-off shaft may thus be transmitted to the generator shaft of the electrical generator, which is spatially separate from the power take-off shaft, in a technically simple and space-saving manner. The wheel drive may also include a gear unit by means of which a certain gear ratio between a generator shaft of the electrical generator and the output shaft may be achieved. This embodiment as well allows a flexible and compact design of the waste heat utilization device.

In one particularly compact and therefore space-saving embodiment, the power take-off shaft may be led coaxially through the expansion machine in such a way that the electrical generator or the wheel drive is situated on a side of the expansion machine facing away from the internal combustion engine. Alternatively, the power take-off shaft may be led coaxially through the electrical generator or the wheel drive, so that the electrical generator or the wheel drive is situated on the power take-off shaft on a side of the expansion machine facing the internal combustion engine.

To be able to re-supply the electrical energy generated by the electrical generator to the drive train of the motor vehicle in order to increase the power, the waste heat utilization device may also include an electric motor which is drivable by the electrical generator. For this purpose, the electric motor may be in drive connection with a main output shaft of the internal combustion engine.

Alternatively or additionally, in one embodiment the electrical generator itself may be designed as a so-called generator motor, so that in a coasting mode state of the motor vehicle the generator motor may act as an electrical generator for generating electrical energy, and in a drive mode state of the motor vehicle may act as an electric motor for driving the power take-off shaft of the motor vehicle. Thus, in the drive mode state, additional drive power may be supplied to the drive train of the motor vehicle in the manner of a so-called "booster," via the main output shaft (by means of a separate electric motor) or via the power take-off shaft (by means of the electrical generator which is designed as a generator motor). The energy necessary for operating the electric motor or generator motor may be withdrawn from a suitable electrical energy store, such as a chargeable battery. The charging of this electrical energy store may then take place by means of the electrical generator, for example when the motor vehicle is in a coasting mode state. In such an operating state, the motor vehicle is not accelerated or even decelerated, so that the electrical energy generated by the electrical generator is not needed by the drive train of the motor vehicle, and instead may be temporarily stored in the electrical energy store for later use.

Furthermore, in one embodiment the electrical generator may be designed in such a way that it is switchable for selectively charging the electrical energy store, in particular the battery, or for driving the main output shaft. The electrical energy generated by the electrical generator may thus be reused in an energy-efficient manner.

The invention further relates to a motor vehicle having an internal combustion engine which includes a main output shaft and a power-take off shaft, and having a waste heat utilization device with one or more of the above-mentioned features. The invention further relates to a method for operating a motor vehicle having this type of design.

Further important features and advantages of the invention result from the drawings, and the associated description of the figures with reference to the drawings.

It is understood that the features mentioned above and to be explained below are usable not only in the particular stated combination, but also in other combinations or alone without departing from the scope of the present invention.

BRIEF DESCRIPTION OF THE DRAWING FIGURES

Preferred exemplary embodiments of the invention are illustrated in the drawings and explained in greater detail in the following description; identical, similar, or functionally equivalent components are denoted by the same reference numerals.

Figure 2:
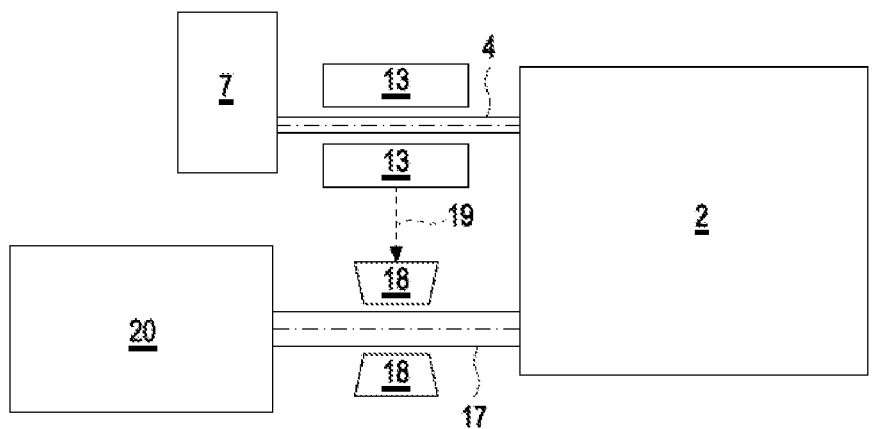
Figure 3:
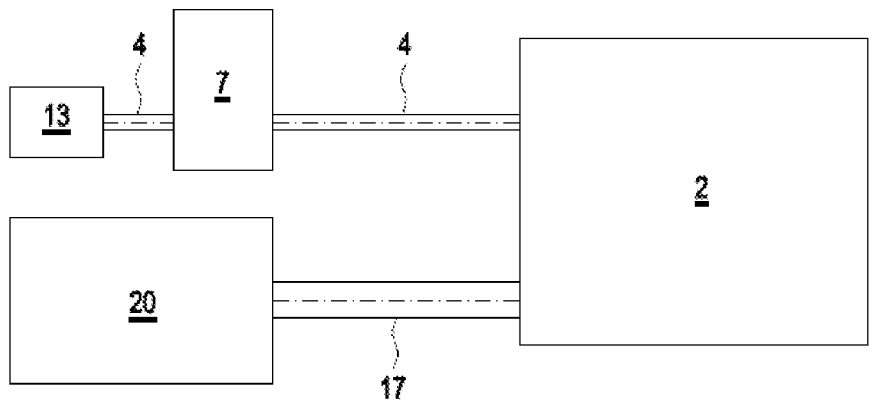
Figure 4:
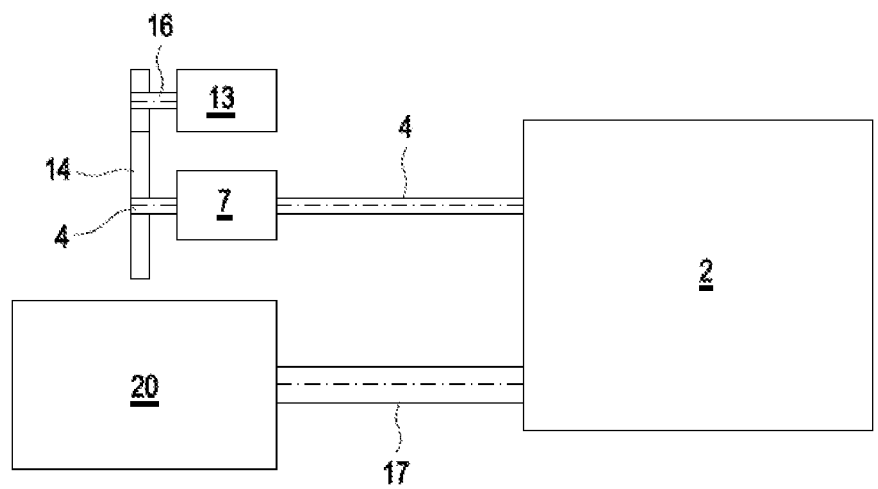

The figures show the following, in each case in a schematic manner:

FIG. 1 shows one exemplary embodiment of a waste heat utilization device according to the invention, FIG. 2 shows a rough schematic illustration of a first variant of the exemplary embodiment according to FIG. 1, FIG. 3 shows a rough schematic illustration of a second variant of the exemplary embodiment according to FIG. 1, and FIG. 4 shows a rough schematic illustration of a third variant of the exemplary embodiment according to FIG. 1.

DETAILED DESCRIPTION

In the illustration in FIG. 1, a waste heat utilization device according to the invention is denoted by reference numeral 1. The waste heat utilization device 1 may be part of a motor vehicle denoted overall by reference numeral 25 in FIG. 1, and which also includes an internal combustion engine 2 having a power take-off shaft 4. The waste heat utilization device 1 may be situated together with the internal combustion engine 2 in the motor vehicle (not shown in FIG. 1). The waste heat utilization device 1 includes a waste heat utilization circuit 3 in which a working medium circulates. The waste heat utilization circuit 3 may be designed in particular as a Rankine cycle or as a Clausius-Rankine cycle.

The waste heat utilization device 1 also includes a conveying device 5, an evaporator 6, an expansion machine 7, and a condenser 8 which are successively situated in the waste heat utilization circuit 3 downstream from the conveying direction 5 of the working medium. The conveying device 5 is used for conveying the working medium against a high pressure. The conveying device 5 may advantageously be designed as a volumetric pump, and for this purpose may be coupled to a drive motor 9. The evaporator 6 is situated in the waste heat utilization circuit 3, downstream from the conveying device 5, and is used for evaporating the working medium, for which purpose the evaporator 6 utilizes waste heat from the internal combustion engine 2. According to the exemplary embodiment, the evaporator 6 is coupled in a heat-transferring manner to an exhaust gas system 10 of the internal combustion engine 2, a corresponding heat flow being indicated by an arrow denoted by reference numeral 11. The internal combustion engine 2 may also have a fresh air system 12.

The expansion machine 7 is situated in the waste heat utilization circuit 3, downstream from the evaporator 6, and is used for expanding the working medium to a low pressure point. The expansion machine 7 may be designed, for example, as a turbine having a rotor and a turbine wheel which is connected to the rotor in a rotationally fixed manner. A piston expander could likewise be named as an example. In this case, the crankshaft of the piston expander corresponds to the turbine wheel.

The condenser 8 is situated in the waste heat utilization circuit 3, downstream from the expansion machine 7, and is used for condensing the working medium. For this purpose, heat is withdrawn from the working medium, as indicated by an arrow denoted by reference numeral 15. The expansion machine 7 is in direct drive connection with the power take-off shaft 4 of the internal combustion engine for purposes of energy recirculation. This means in particular that the power take-off shaft 4 simultaneously functions as a rotor shaft of the expansion machine 7. By means of the expansion machine 7, for this purpose energy is withdrawn from the working medium, in particular in the form of mechanical work, via which the power take-off shaft 4 of the internal combustion engine 2 is driven.

In addition, the waste heat utilization device 1 has an electrical generator 13 that likewise is in drive connection with the power take-off shaft 4, in particular in a direct or indirect manner. FIG. 1 shows an indirect drive connection that may be implemented in the form of a wheel drive 14, for example, by means of which the power take-off shaft 4 of the internal combustion engine 1 may be in operative connection with a generator shaft 16 of the electrical generator 13 for transferring power. The wheel drive 14 may be designed as a belt drive, chain drive, and/or gear drive. In principle, however, within the meaning of an indirect drive transfer, any component may be intended that is suitable for transferring drive power from the power take-off shaft 4 to a generator shaft 16 situated at a distance, i.e., separate, therefrom. This also includes in particular a conventional gear unit.

According to the direct drive connection roughly schematically illustrated in FIG. 2, the electrical generator 13 is situated directly on the power take-off shaft 4 of the internal combustion engine 2; i.e., the power take-off shaft 4 simultaneously functions as a rotor of the electrical generator 13. In the variant shown in FIG. 2, the power take-off shaft 4 is led coaxially through the electrical generator 13, so that the electrical generator 13 is situated on the power take-off shaft 4 on a side of the expansion machine 7 facing the internal combustion engine 2.

According to the exemplary embodiment in FIG. 1, the waste heat utilization device 1 may now also include an electric motor 18, which is in drive connection with a main output shaft 17 of the internal combustion engine 2. To this end, a rotor of the electric motor 18, which is rotatable relative to a stator of the electric motor 18, may be connected in a rotationally fixed manner to a main output shaft 17 of the internal combustion engine 2. The electric motor 18 may be driven by the electrical energy generated by the electrical generator 13, and thus may provide additional drive power for the main output shaft 17 of the internal combustion engine 2. The transmission of the electrical energy from the electrical generator 13 to the electric motor 18 may take place by means of suitable electrical transfer means 19, for example in the form of conventional electrical lines. Additional drive power generated by the electric motor 18 may be directly introduced into a drive train 20 of the motor vehicle via the main output shaft 17 (see FIG. 2).

In addition, as shown in FIG. 1, the electrical generator 13 may be used for charging an electrical energy store 21, in particular a chargeable battery. This type of charging of the electrical energy store 21 by means of electrical energy generated by the electrical generator 13 preferably takes place precisely when no torque is requested by the motor vehicle which is driven by the internal combustion engine 2, for example when the motor vehicle is not be accelerated, or even decelerated. Such an operating state of the motor vehicle is typically also referred to as a coasting mode state. In this case, it is not necessary or desirable for the electric motor 18 to supply the main output shaft 17, and thus the drive train 20, with assisting torque. It is then advisable to temporarily store the electrical energy generated by the electrical generator 13 in the electrical energy store 21 for later use.

The electrical energy stored in the electrical energy store 21 may be reused, if necessary, in various ways, for example to supply various vehicle components, in particular various electrical consumers of the motor vehicle, with electrical energy, or also to drive the electric motor 18 when an additional torque is to be supplied to the main output shaft 17. In this case, electrical energy stored in the electrical energy store 21 may be transmitted from the electrical energy store 21 to the electric motor 18 by suitable electrical transfer means 22, for example by conventional electrical transmission lines.

In one advantageous variant, for increasing the power of the internal combustion engine 2, the electrical generator 13 may be designed as a so-called generator motor and thus, if necessary, used itself as an electric motor, so that drive power of the electrical generator 13 which is operated as an electric motor is introduced into the drive train 20 of the motor vehicle via the power take-off shaft 4. The generator motor may be driven by means of electrical energy stored in the electrical energy store 21. This type of power-increasing use of the generator motor is also referred to as a booster operating state of the internal combustion engine 2.

In another variant, the electrical generator 13 may also be designed in such a way that it is switchable for selectively charging the electrical energy store 21 or for driving the main output shaft 17 of the internal combustion engine 2 (by means of the electric motor 18). As mentioned above, charging the electrical energy store 21 is advisable precisely when the motor vehicle is in the coasting mode state.

For controlling the electrical generator 13 (including switching the operating states) and/or the electric motor 18, a suitable control device (not shown in the figures) may be provided in the waste heat utilization device 1.

In one particularly space-saving variant of the direct drive connection between the electrical generator 13 and the power take-off shaft 4 shown in FIGS. 3 and 4, the power take-off shaft 4 may now be led coaxially through the expansion machine 7, so that the electrical generator 13 (FIG. 3) or the wheel drive 14 (FIG. 4) is situated on a side of the expansion machine 7 facing away from the internal combustion engine 2.

The internal combustion engine 2 described in the exemplary embodiment according to FIGS. 1 through 4 may now be used according to the invention within the scope of an operating method for the motor vehicle 25 which, in addition to the waste heat utilization device 1 according to the invention as shown in FIG. 1, also has an internal combustion engine 2 with a power take-off shaft 4. The motor vehicle 25 may be operated in various operating states in the operating method according to the invention.

Thus, according to the invention, during a coasting mode state of the motor vehicle 25, operating power of the expansion machine 7 and operating power of the power take-off shaft 4 are converted into electrical energy by means of the electrical generator 13.

In contrast, during a drive mode state of the motor vehicle 25, operating power of the expansion machine 7 is introduced into the drive train 20 of the motor vehicle 25 via the power take-off shaft 4. In a special variant of the drive mode state, the so-called booster operating state, for increasing power the electrical generator 13 is operated as an electric motor in the drive mode state, and operating power of the electric motor 13 is introduced into the drive train 20 of the motor vehicle 2 via the power take-off shaft 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A waste heat utilization device for a motor vehicle, the device comprising:
    a waste heat utilization circuit containing a working medium that circulates through the waste heat utilization circuit;
    a conveying device arranged in the waste heat utilization circuit and configured to drive the working medium;
    an evaporator arranged in the waste heat utilization circuit downstream from the conveying device and configured to evaporate the working medium;
    an expansion machine directly disposed on a power take-off shaft of an internal combustion engine and arranged in the waste heat utilization circuit downstream from the evaporator and configured to expand the working medium;
    a condenser arranged in the waste heat utilization circuit downstream from the expansion machine and configured to condense the working medium;
    an electrical generator in direct or indirect drive connection with the power take-off shaft of the internal combustion engine of the motor vehicle;
    wherein the expansion machine is in direct drive connection with the power take-off shaft of the internal combustion engine to recirculate energy, and
    wherein the power take-off shaft of the internal combustion engine simultaneously functions as a rotor shaft of the expansion machine.

2. The waste heat utilization device of claim 1, wherein the electrical generator is arranged on the power take-off shaft.

3. The waste heat utilization device of claim 1, wherein the electrical generator is arranged on a separate generator shaft that is in operative connection with the power take-off shaft.

4. The waste heat utilization device of claim 3, wherein the power take-off shaft is in drive connection with the separate generator shaft by a wheel drive, which is a belt drive, chain drive, or gear drive.

5. The waste heat utilization device of claim 4, wherein
    the power take-off shaft is led coaxially through the expansion machine in such a way that the electrical generator or the wheel drive is arranged on a side of the expansion machine facing away from the internal combustion engine, or
        the power take-off shaft led coaxially through the electrical generator or the wheel drive so that the electrical generator is situated on the power take-off shaft on a side of the expansion machine facing the internal combustion engine.

6. The waste heat utilization device of claim 1, further comprising:
    an electric motor drivable by the electrical generator, wherein the electric motor is in drive connection with a main output shaft of the internal combustion engine.

7. The waste heat utilization device of claim 1, wherein the electrical generator is a generator motor, so that in a coasting mode state of the motor vehicle the generator motor acts as an electrical generator for generating electrical energy, and in a drive mode state of the motor vehicle, acts as an electric motor for driving the power take-off shaft of the motor vehicle.

8. A motor vehicle, comprising:
    an internal combustion engine which includes a main output shaft and a power take-off shaft, and
    a waste heat utilization device, which comprises:
        a waste heat utilization circuit containing a working medium that circulates through the waste heat utilization circuit;
        a conveying device arranged in the waste heat utilization circuit and configured to drive the working medium;
        an evaporator arranged in the waste heat utilization circuit downstream from the conveying device and configured to evaporate the working medium;
        an expansion machine directly disposed on a power take-off shaft of an internal combustion engine and arranged in the waste heat utilization circuit downstream from the evaporator and configured to expand the working medium;
        a condenser arranged in the waste heat utilization circuit downstream from the expansion machine and configured to condense the working medium;
        an electrical generator in direct or indirect drive connection with the power take-off shaft of the internal combustion engine of the motor vehicle;
        wherein the expansion machine is in direct drive connection with the power take-off shaft of the internal combustion engine to recirculate energy, and
        wherein the power take-off shaft of the internal combustion engine simultaneously functions as a rotor shaft of the expansion machine.

9. A method for operating a motor vehicle which includes an internal combustion engine and a waste heat utilization device comprising a waste heat utilization circuit containing a working medium that circulates through the waste heat utilization circuit, a conveying device arranged in the waste heat utilization circuit and configured to drive the working medium, an evaporator arranged in the waste heat utilization circuit downstream from the conveying device and configured to evaporate the working medium, an expansion machine directly disposed on a power take-off shaft of an internal combustion engine and arranged in the waste heat utilization circuit downstream from the evaporator and configured to expand the working medium, a condenser arranged in the waste heat utilization circuit downstream from the expansion machine and configured to condense the working medium, an electrical generator in direct or indirect drive connection with the power take-off shaft of the internal combustion engine of the motor vehicle, wherein the expansion machine is in direct drive connection with the power take-off shaft of the internal combustion engine such that the expansion machine is situated directly on the power take-off shaft to recirculate energy, and wherein the power take-off shaft of the internal combustion engine simultaneously functions as a rotor shaft of the expansion machine, the method comprising:
    during a coasting mode state of the motor vehicle, operating power of the expansion machine and operating power of the power take-off shaft are converted into electrical energy by the electrical generator; and during a drive mode state of the motor vehicle, operating power of the expansion machine is introduced into a drive train of the motor vehicle via the power take-off shaft; and in order to increase for increasing power, in the drive mode state the electrical generator is operated as an electric motor, and operating power of the electric motor is introduced into the drive train of the motor vehicle via the power take-off shaft.

* * * * *